(12) United States Patent
Said et al.

(10) Patent No.: US 9,508,048 B2
(45) Date of Patent: Nov. 29, 2016

(54) SYSTEM AND METHOD FOR INTEGRATED REAL TIME REPORTING AND ANALYTICS ACROSS NETWORKED APPLICATIONS

(75) Inventors: Bare Said, St. Leon (DE); Jan Teichmann, Neustadt/Weinstrasse (DE)

(73) Assignee: SAP SE, Walldorf (DE)

( * ) Notice: Subject to any disclaimer, the term of this patent is extended or adjusted under 35 U.S.C. 154(b) by 1082 days.

(21) Appl. No.: 12/977,818

(22) Filed: Dec. 23, 2010

(65) Prior Publication Data

US 2012/0166620 A1 Jun. 28, 2012

(51) Int. Cl.
G06F 15/173 (2006.01)
G06Q 10/06 (2012.01)
G06F 17/30 (2006.01)

(52) U.S. Cl.
CPC ......... *G06Q 10/06* (2013.01); *G06F 17/30286* (2013.01); *G06F 17/30333* (2013.01); *G06F 17/30336* (2013.01); *G06F 17/30339* (2013.01); *G06F 17/30463* (2013.01); *G06F 17/30466* (2013.01); *G06F 17/30471* (2013.01)

(58) Field of Classification Search
CPC ............ G06Q 10/06; G06F 17/30339; G06F 17/30336; G06F 17/30333; G06F 17/30286; G06F 17/30463; G06F 17/30471; G06F 17/30466
USPC .......................... 709/223–226; 707/600–606
See application file for complete search history.

(56) References Cited

U.S. PATENT DOCUMENTS

| | | | |
|---|---|---|---|
| 2003/0046272 A1* | 3/2003 | Scanzano | G06F 17/30595 |
| 2003/0154348 A1* | 8/2003 | Keltcher et al. | 711/133 |
| 2005/0027675 A1* | 2/2005 | Schmitt et al. | 707/1 |
| 2005/0091093 A1* | 4/2005 | Bhaskaran et al. | 705/7 |
| 2007/0150835 A1* | 6/2007 | Muller | 715/810 |
| 2008/0215621 A1* | 9/2008 | Ravindran et al. | 707/104.1 |
| 2009/0063524 A1* | 3/2009 | Adler | G06F 17/30241 |
| 2009/0125531 A1* | 5/2009 | Scheerer et al. | 707/100 |
| 2010/0064737 A1* | 3/2010 | Upadhyaya et al. | 70/8 |
| 2011/0087708 A1* | 4/2011 | Teichmann et al. | 707/803 |
| 2011/0106789 A1* | 5/2011 | Gao et al. | 707/713 |
| 2011/0131242 A1* | 6/2011 | Bent | G06F 17/30545 707/770 |
| 2011/0264626 A1* | 10/2011 | Gautam et al. | 707/626 |
| 2011/0271278 A1* | 11/2011 | Dittrich | 718/1 |

OTHER PUBLICATIONS

Date, "An Introduction to Database Systems", sixth edition, 1995, pp. 606, 607.*

* cited by examiner

*Primary Examiner* — Chris Parry
*Assistant Examiner* — WeiWei Stiltner
(74) *Attorney, Agent, or Firm* — Jones Day (57) ABSTRACT

Embodiments of the present invention may provide a system and method for providing real time analytics and reporting across networked applications. The real time analytics and reporting across networked applications may be provided by extending the reporting metadata and the corresponding design- and runtime-tools. Based on a cross NWAs MDAV-Definition, the corresponding metadata (subview and subquery definitions) may be generated and assigned to the corresponding NWA-Layer (NWA software component). At deployment and configuration time, the relevant views may be activated depending availability of underlying data. At runtime, an MDAV executer (e.g., a MDAV runtime engine) may run a distributed and optimized provisioning of reporting and analytics data. The data provisioning scheme may depend on selection parameters, filters, join conditions between parts in different NWAs, analytical functions defined in the report, and the locality of the data (local or remote).

20 Claims, 10 Drawing Sheets

Tenant 1 installation 602

Table 1

| LastName | Travel Expense Category |
|---|---|
| Rafferty | 1 |
| Steinberg | 4 |
| John | 2 |

Application Platform 606

Table 2

| LastName | DepartmentID |
|---|---|
| Rafferty | 31 |
| Jones | 33 |
| Steinberg | 33 |
| Robinson | 34 |
| Smith | 34 |
| John | NULL |

Tenant 2 installation 604

Table 3

| DepartmentID | DepartmentName |
|---|---|
| 31 | Sales |
| 33 | Engineering |
| 34 | Clerical |
| 35 | Marketing |

Logical LEFT OUTER JOIN table — 608

| LastName | Travel Expense Category | DepartmentID | DepartmentName |
|---|---|---|---|
| Rafferty | 1 | 31 | Sales |
| Jones | NULL | 33 | Engineering |
| Steinberg | 4 | 33 | Engineering |
| Robinson | NULL | 34 | Clerical |
| Smith | NULL | 34 | Clerical |
| John | 2 | NULL | NULL |

SYSTEM AND METHOD FOR INTEGRATED REAL TIME REPORTING AND ANALYTICS ACROSS NETWORKED APPLICATIONS

FIELD

The disclosed subject matter relates to the field of computer systems and, more particularly, to a system and method for integrated real time reporting and analytics across networked applications (NWAs) that are deployed on different systems or tenants

BACKGROUND

In the business world, reports are often used to inform a reader about selected topics of interest so that information can be used to provide a general view on the subject in hand, to drive decision making, etc. Reports may also include persuasive elements, such as recommendations, suggestions, or other motivating conclusions that indicate possible future actions the report reader could take. There are different types of business reporting, for example, informational reporting, analytical reporting, operational reporting, and so on.

A business organization typically uses multiple business applications for a variety of functions. Traditionally, data warehousing has been used to facilitate reporting and analysis across the multiple business applications. Data warehousing increases the total cost of ownership (TCO). Further, using a data warehouse for operational reporting may lead to difficulties caused by replication of large amount of data and providing such data in-time. For example, in order to generate a report, predefined content of data is determined and replicated in the data warehouse. The predefined content is usually a small subset of the available data in a transactional system, such as Online Transactional Processing (OLTP). Since the operational reporting is to be used by every employee in a company at all levels of the organization, the determination of adequate predefined reporting content becomes very difficult, as each employee may require different data and may need a different report. Thus, large amounts of data have to be replicated at the data warehouse to support all possible scenarios for operational reporting. This not only increases cost but also makes real-time reporting and analysis extremely hard.

Therefore, there is a need for a system and method that provides infrastructure components and enhanced scheme to allow integrated real time reporting and analytics across business applications that are deployed on different systems or tenants.

DETAILED DESCRIPTION

Embodiments of the present invention may provide a system and method for providing real time analytics and reporting across networked applications. The real time analytics and reporting across networked applications may be provided by extending the reporting metadata and the corresponding design- and runtime-tools. Based on a cross NWAs MDAV-Definition, the corresponding metadata (subview and subquery definitions) may be generated and assigned to the corresponding NWA-Layer (NWA software component) at deployment and configuration time. The relevant views may be activated depending availability of underlying data. At runtime, an MDAV executer may run a distributed and optimized provisioning of reporting and analytics data. The data provisioning scheme may depend on selection parameters, filters, join conditions between parts in different NWAs, analytical functions defined in the report, and the locality of the data (local or remote).

Figure 1:
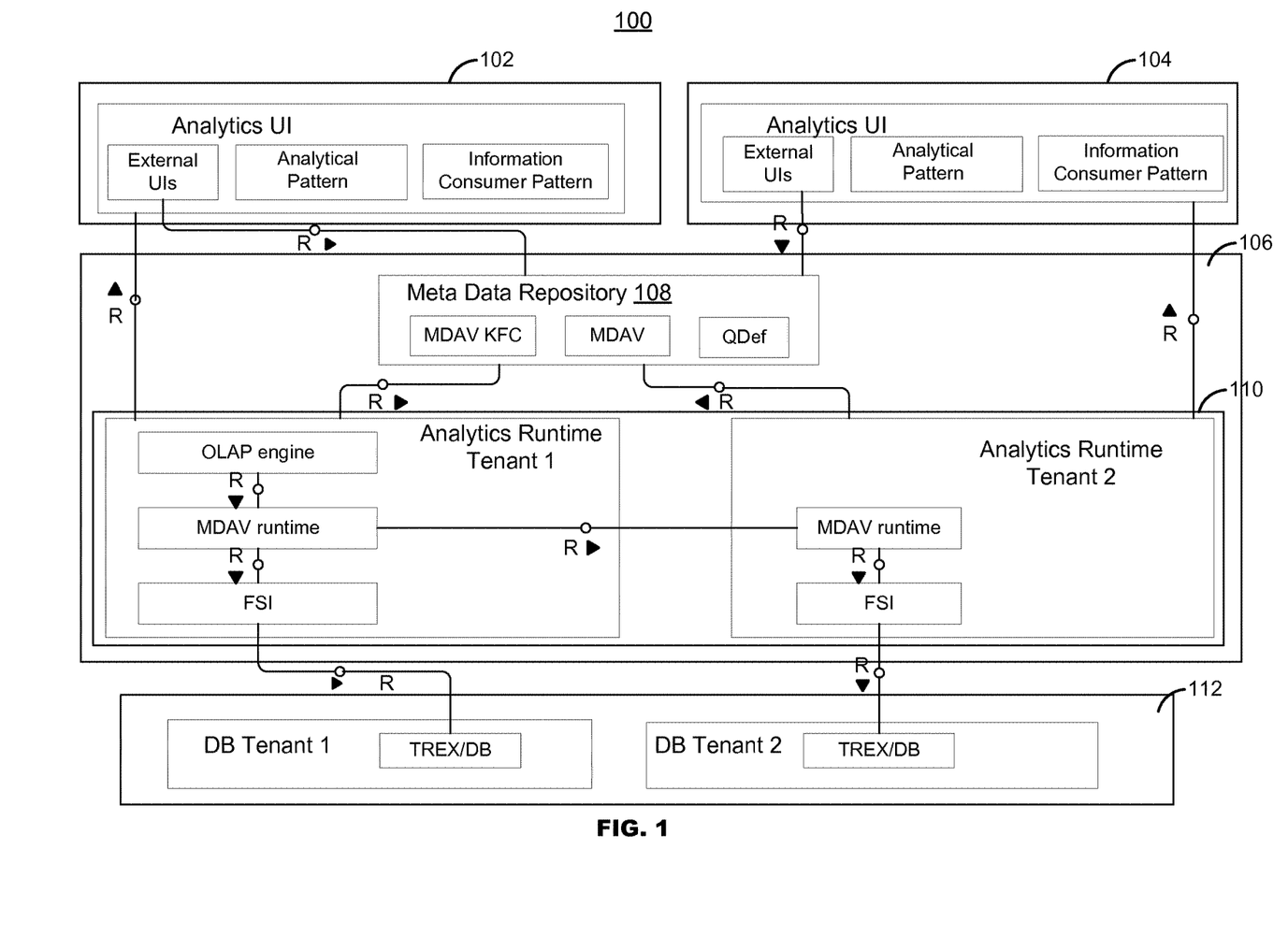
FIG. 1 is a diagram of a system for across networked applications reporting and analysis according to an exemplary embodiment of the present invention.

FIG. 1 illustrates a system 100 that provides reporting and analysis for data across networked applications (NWAs) according to an exemplary embodiment of the present invention. The system 100 may comprise a plurality of business applications, such as, but not limited to, business applications 102 and 104. The business applications 102 and 104 may be on top of an application platform 106. The application platform 106 may comprise a metadata repository 108 and an analytics runtime 110. The analytics runtime 110 may have a multi-tenancy architecture to support a plurality of tenants, such as, but not limited to, an analytics runtime tenant 1 and an analytics runtime tenant 2. In one embodiment, each analytics runtime tenant may correspond to a particular business application. The business applications 102 and 104 may store data in a database (DB) 112. The database 112 may also have a multi-tenancy architecture that each business application may store data in a respective database tenant (e.g., DB tenant 1 for the business application 102 and DB tenant 2 for the business application 104). Each DB tenant may comprise an indexing and search engine (e.g., TREX/DB).

Each of the business applications 102 and 104 may comprise an analytics user interface (UI) for reporting and analytics. In one embodiment, the analytics UI may comprise external UIs (e.g., Crystal Reports®), analytical pattern and information consumer pattern. The information consumer and the analytics patterns may be UI elements to support embedded Analytics and reporting. The information consumer pattern may be used to build simple reports and analytical pattern) may be used to build highly sophisticated analytical reports with slicing and dicing capabilities.

The metadata repository 108 may store metadata to facilitate analytics and reporting for the business applications (e.g., the business applications 102 and 104). Each metadata repository may contain multi dimensional analytical views (MDAVs), query definitions (QDefs) and MDAV Key Figure Composite (MDAV KFC). These artifacts may be used to build a reporting and analytical content on top of the business Objects. The query definition artifact may specify how the business data may be retrieved. The MDAV artifact may extend the QDef artifact with additional meta data like for example referencing other Master Data MaDAV in order to retrieve the corresponding Master data for a query definition result. The MDAV key figure composite artifact extends a MDAV artifact with metadata related to Key figures and characteristics structure. In one embodiment, the business applications 102 and 104 may provide reporting and analysis based on business objects metamodels. Those defined artifacts may relate directly to defined and modeled business objects (e.g., sales order or customer).

An analytics runtime engine may be available in each tenant (because the analytical runtime engine may be provided as part of platform infrastructure). Each of the analytics runtime may contain an MDAV runtime engine and an FSI (Fast search Infrastructure). The MDAV Runtime Engine may be the main consumer of the analytics and reporting artifacts defined in the metadata repository. MDAV KFCs, MDAVs and QDefs may be processed by the MDAV runtime engine in order to fetch the right data and to expose them to the OLAP processor in the appropriate format. FSI may be triggered by the MDAV engine to retrieve the appropriate data rapidly using the in-memory Database feature of the FSI. The MDAV runtime engine may execute the MDAVs and provide desired reporting and analytics data to the business applications (e.g., present to a user via the analytics UI).

In one embodiment, the business application 102 may generate report based on data from multiple networked applications (e.g., networked business applications). The corresponding analytics runtime located in tenant 1 may execute an online analysis processing (OLAP) query engine that retrieves data from multiple/different tenants or multiple/different database systems (e.g., business data for different business applications). The details of data retrieval will be described later with respect to FIGS. 7-8.

In one embodiment, to facilitate reporting and analytics across networked application, the development infrastructure may support the following features: reporting model definition across the networked applications, data retrieval across the networked applications, no need for additional metadata harmonization among the networked applications, no need for replication of application business data to a central data hub. In one embodiment, all defined metadata that specifies a reporting or analytics model may be shared and aligned across the networked applications. Although the data to be analyzed and reported on may be spread in different applications (e.g., in different physical systems or tenants), one business application running a report or analysis may access all data across the networked applications. Thus, costly and error prone transactional data replication may be eliminated. Further, redundant reporting and analytical semantic model by a warehouse hub may be avoided. In one embodiment, the networked applications may be based on the same application platform, and thus, all relevant metadata may be harmonized and shared between the different applications without additional efforts.

Figure 2:
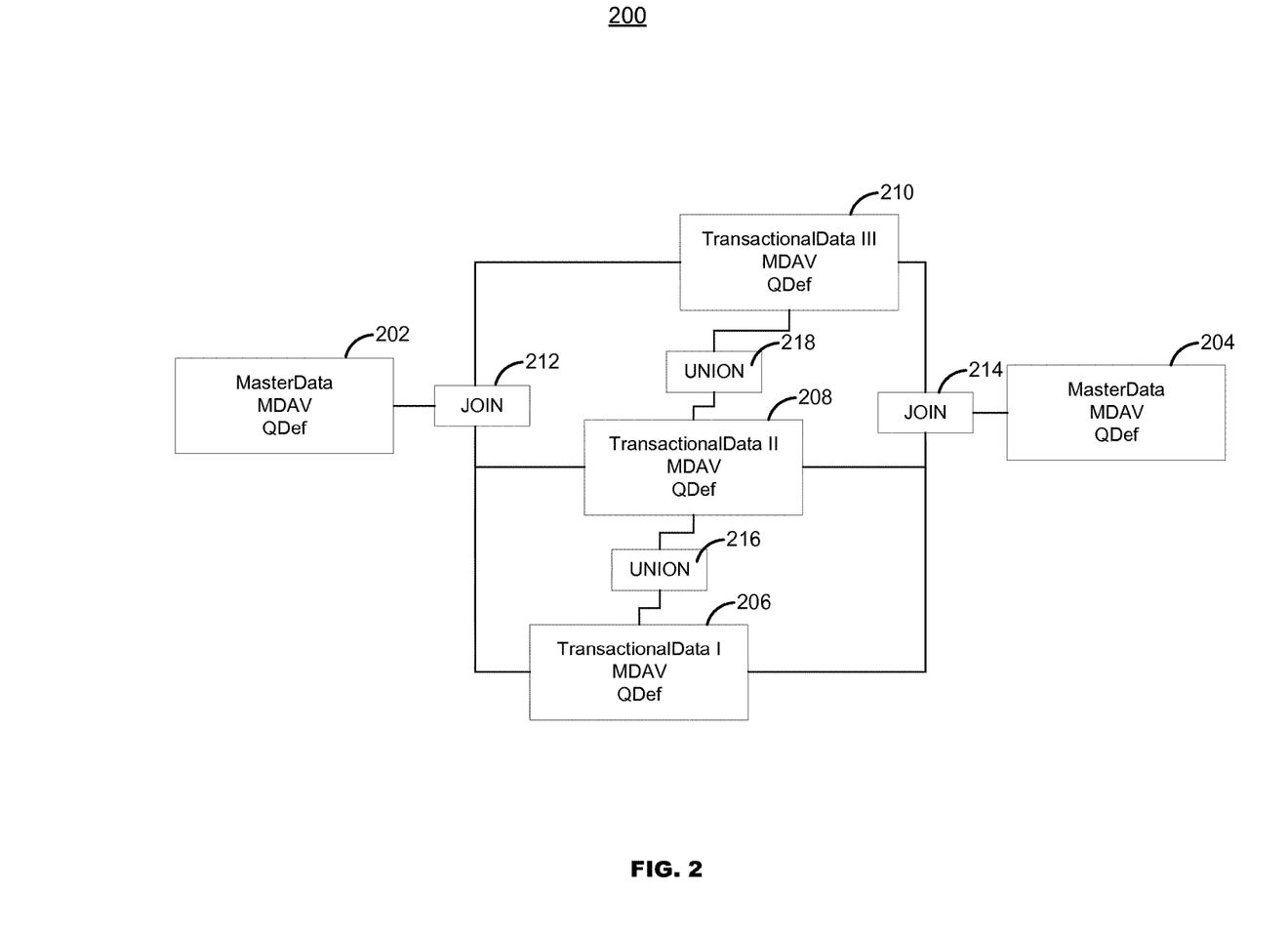
FIG. 2 illustrates an exemplary relationship among metadata entities according to an exemplary embodiment of the present invention.

FIG. 2 illustrates an exemplary relationship 200 among metadata entities according to an exemplary embodiment of the present invention. MDAVs may be based on data from a variety of sources, for example, transactional data, master data. A transactional data MDAV may be combined with other transactional MDAVs in a UNION. Further, master data may be joined with Master Data MDAVs (MD MDAVs). These MD MDAVs may contain "display only" attributes and their data may be retrieved in a later step after the transactional data to be shown (in the result set) have been determined. Often, the master data are not used as selection or filtering conditions, therefore they do not have any impact on the number of retrieved rows (number of records of a result set) when a query is executed. The exemplary relationship 200 may comprise two master data MDAVs 202 and 204, three transactional data MDAVs 206, 208 and 210. The master data MDAV 202 may be joined with the transactional data MDAVs 206, 208 and 210 (e.g., by the JOIN 212). The master data MDAV 204 may be joined with the transactional data MDAVs 206, 208 and 210 (e.g., by the JOIN 214). In addition, the transactional data MDAVs 206 and 208 may be combined by a UNION 216, and the transactional data MDAVs 208 and 210 may be combined by a UNION 218.

Figure 3:
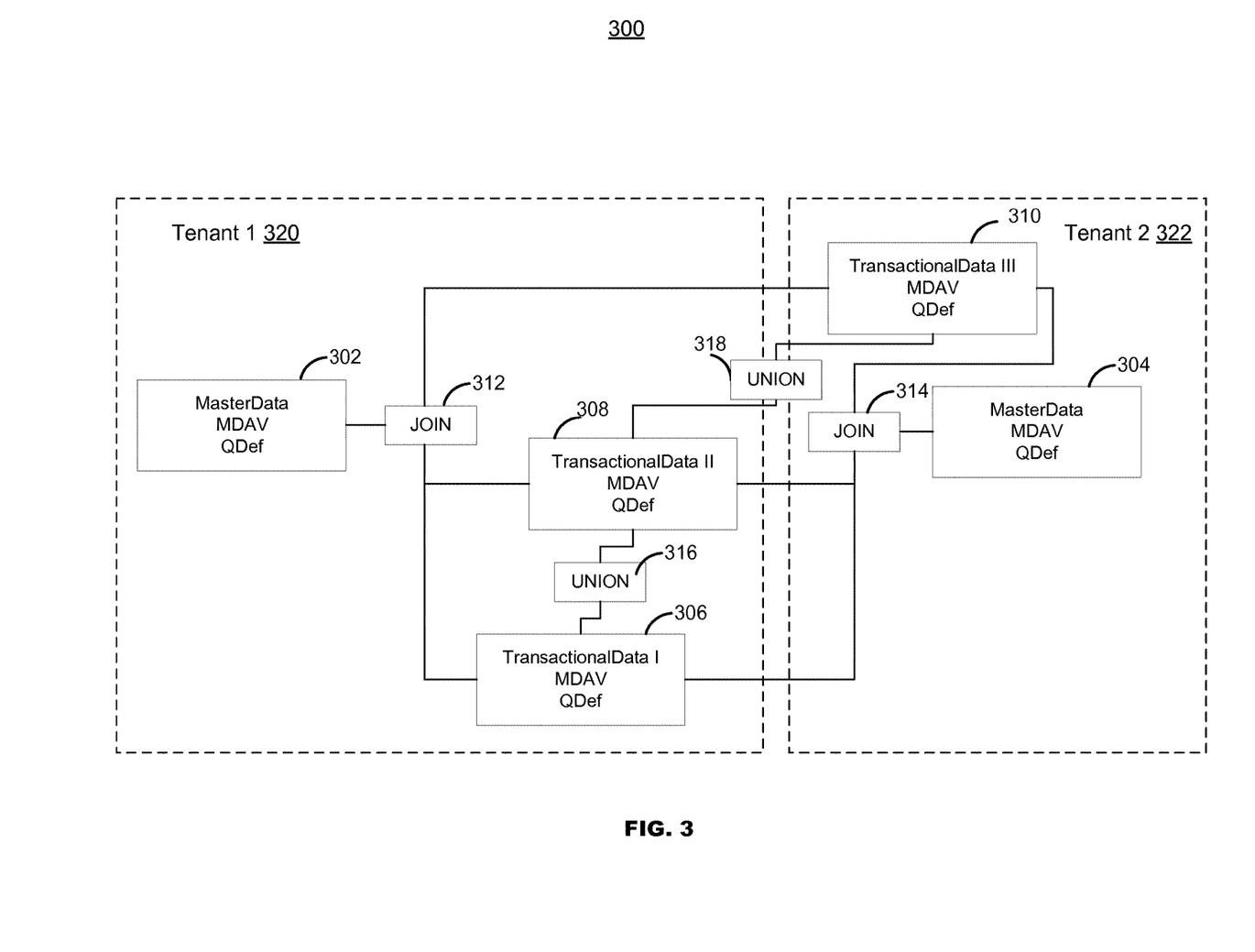
FIG. 3 illustrates an exemplary distribution scenario for metadata and data according to an exemplary embodiment of the present invention.

FIG. 3 illustrates an exemplary distribution scenario 300 for metadata and data according to an exemplary embodiment of the present invention. As shown in FIG. 3, the tenant 1 320 may comprise the master data MDAV 302 and the transactional data MDAVs 306 and 308. The tenant 2 322 may comprise the master data MDAV 304 and the transactional data MDAV 310. The master data MDAV 302 may be joined with the transactional data MDAVs 306, 308 and 310 (e.g., by the JOIN 312). The master data MDAV 304 may be joined with the transactional data MDAVs 306, 308 and 310 (e.g., by the JOIN 314). In addition, the transactional data MDAVs 306 and 308 may be combined by a UNION 316, and the transactional data MDAVs 308 and 310 may be combined by a UNION 318. Because the transactional data MDAVs 308 and 310 may reside in different tenants, the UNION 318 may unite equivalent data from different sources into one result set and report/analysis may be performed on the result set. In one embodiment, transactional data may be fetched in parallel for a UNION operation and united in the one tenant.

In one embodiment, the business application and UI running the report may correspond to the tenant 1 and thus, the tenant 1 may be referred as "local" and tenant 2 "remote," and the data fetched from tenant 2 may be fetched remotely.

In one embodiment, master data MDAVs may be joined to a single Master Data key and master data reside in one of the tenants but not distributed.

Figure 4:
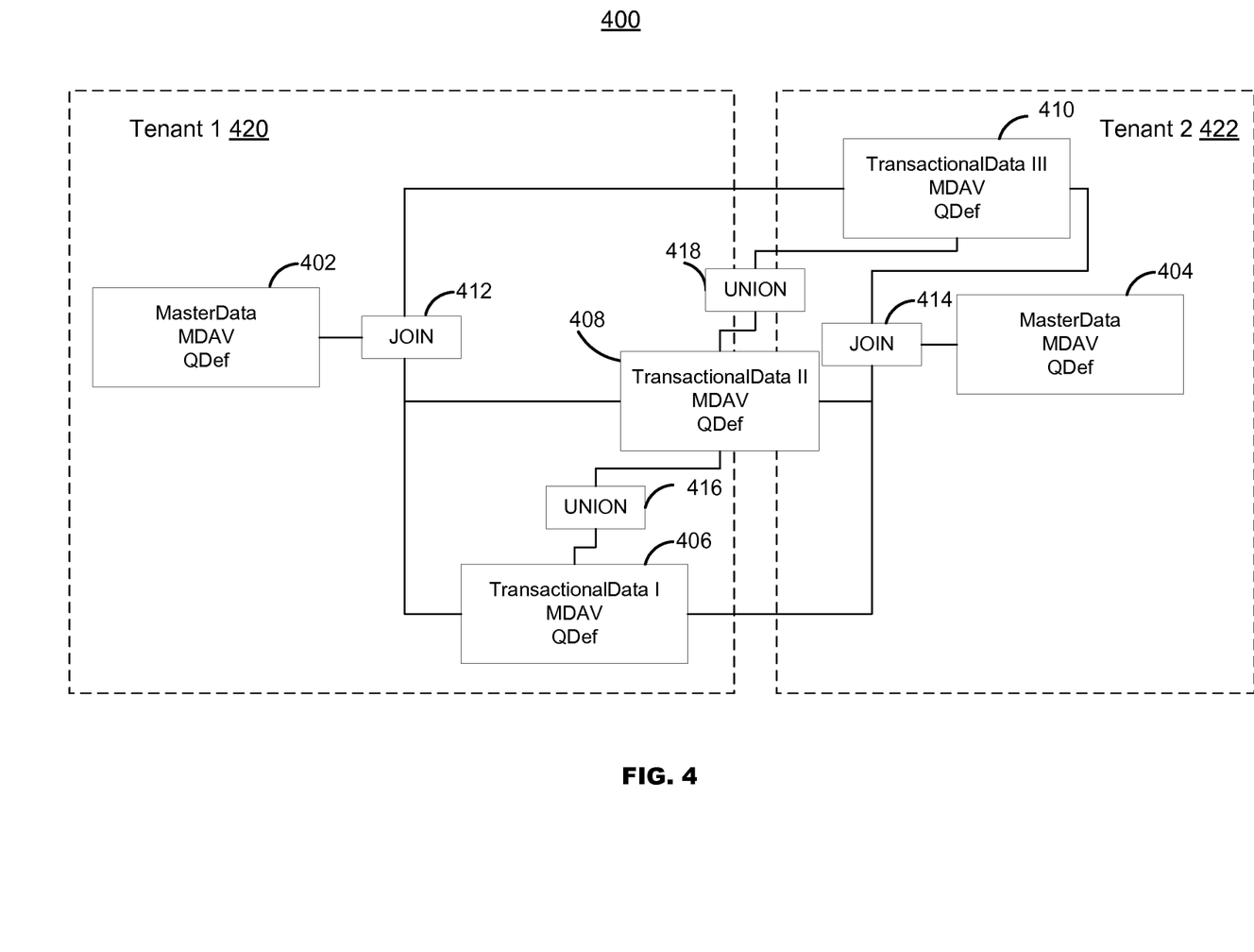
FIG. 4 illustrates another exemplary distribution scenario for metadata and data according to an exemplary embodiment of the present invention.

FIG. 4 illustrates another exemplary distribution scenario 400 for metadata and data according to an exemplary embodiment of the present invention. As shown in FIG. 4, the tenant 1 420 may comprise the master data MDAV 402 and the transactional data MDAV 406. The tenant 2 may comprise the master data MDAV 404 and the transactional data MDAV 410. The transactional data MDAV 408 may be shared between the tenant 1 420 and tenant 2 422. The master data MDAV 402 may be joined with the transactional data MDAVs 406, 408 and 410 (e.g., by the JOIN 412). The master data MDAV 404 may be joined with the transactional data MDAVs 406, 408 and 410 (e.g., by the JOIN 414). In addition, the transactional data MDAVs 406 and 408 may be combined by a UNION 416, and the transactional data MDAVs 408 and 410 may be combined by a UNION 418.

Because the transactional data MDAV 408 may be shared between the tenant 1 420 and tenant 2 422, it may contain data residing in both the tenant 1 420 and tenant 2 422. The UNION 418 may unite equivalent data from different sources into one result set and report/analysis may be performed on the result set. In one embodiment, transactional data may be fetched in parallel for the transactional data MDAV 408 and united in the one tenant.

In one embodiment, the remote master data MDAV (e.g., the master data MDAV 404) may be used for reporting and analytics. For example, the master data MDAVs may be processed in a second step after retrieving transactional data. All Master Data IDs may be known, the amount of Master Data may typically be small. Even if the amount of data may be big, it needs to be fetched anyway. Remote Union MDAVs may also be possible. All filters can be applied to the remote data (on the remote side) before fetching them. Results of all MDAVs in the UNION may be united in the local MDAV runtime. In one or more embodiments, the amount of data that needs to be fetched remotely may be minimized.

Figure 5:
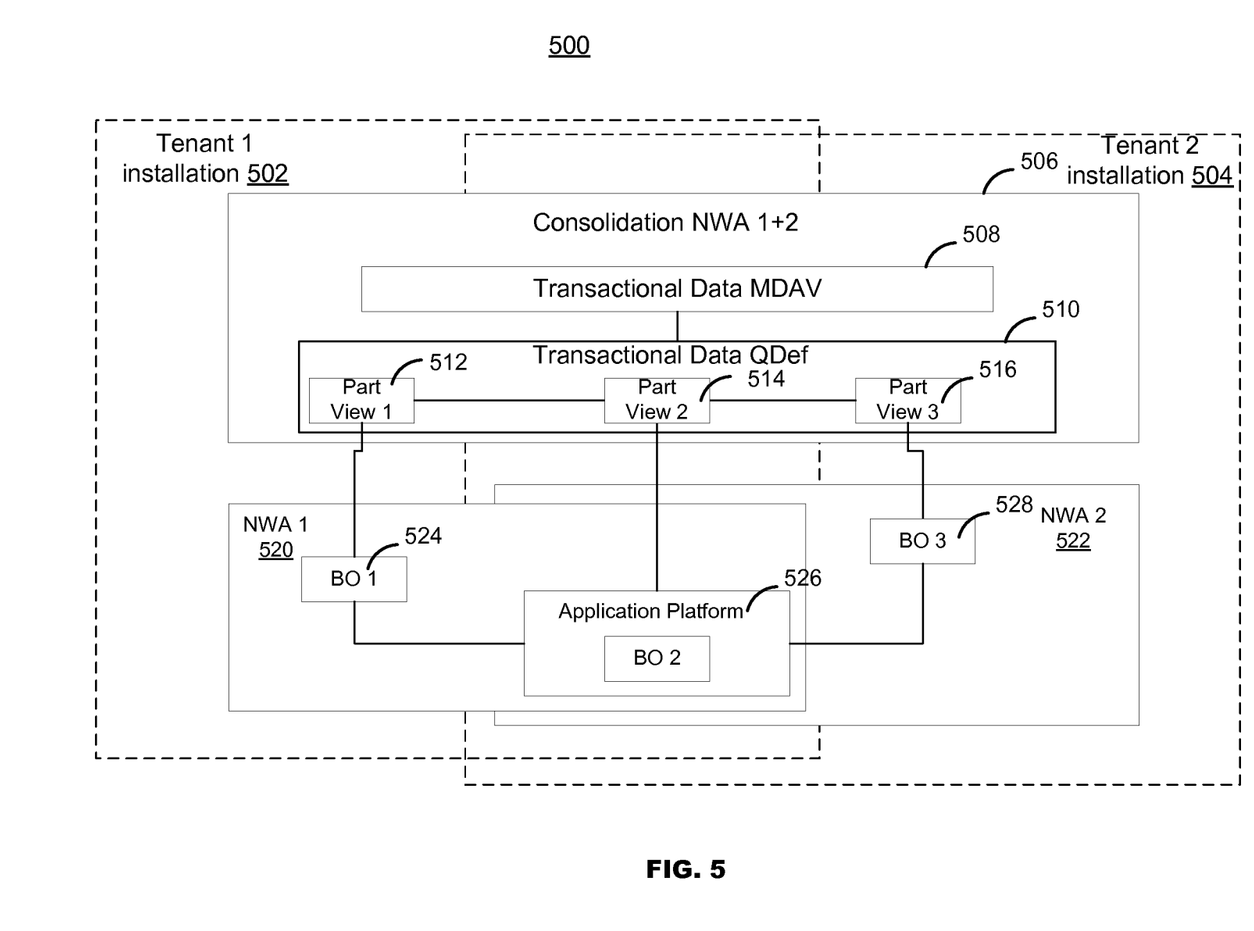
FIG. 5 illustrates software layers and tenants and metadata distribution according to an exemplary embodiment of the present invention.

FIG. 5 illustrates software layers and tenants and metadata distribution according to an exemplary embodiment of the present invention. As shown in FIG. 5, a cross NWA layer 506 may cross the tenant 1 installation 502 and tenant 2 installation 504. The tenant 1 installation 502 and tenant 2 installation 504 may include networked applications (NWAs) 520 and 522, respectively. The NWAs 520 and 522 may share a common application platform 526. The cross NWA layer 506 may be a cross-NWA consolidation software layer on top of the NWAs (e.g., NWAs 520 and 522) to be combined. The cross NWA layer 506 may include the transactional data MDAV 508 and transactional data QDef 514. The transactional data MDAV 508 may be a "shared" MDAV. In one embodiment, the shared MDAV 508 may be defined by using business objects (BOs) defined in different NWAs and the transactional data QDef 510 may includes part views corresponding to the BOs in different NWAs. For example, the NWA 520 may include a BO 524, the NWA 522 may include a BO 528, and the application platform 526 may include a BO 526 shared by the NWAs 520 and 522. The transactional data QDef 510 may include part views 512, 514 and 516 corresponding to the BOs respectively. In one embodiment, the flat view part of an MDAV may be mainly represented by the underlying QDef which references BOs/BO nodes.

In one embodiment, for a scenario of foreign key relationships (basis for join) between two NWA BOs, the application platform's BO may be a foundation BO (e.g., defining foreign key relationship between the two NWA BOs). Further, the foundation BOs may be replicated between all NWAs and their data may be available on both sides of a join operation. In any event, a UNION of BOs/views may still be possible.

In one embodiment, NWAs may include application platform's BOs if the NWA is making use of it—so, there will not be a separate tenant running with application platform's content and 2 tenants with NWA content, but application platform's BOs will formally belong to one or both NWAs. That is, the application platform's BO may be part of the application platform.

FIG. 5 may illustrate where, in one embodiment, the different parts of the metadata created in these software layers may be installed and activated. In one embodiment, the metadata of the consolidation layer may only partly be activated in the 2 tenants. For example, a user may define cross-NWA analytical reports when all necessary metadata are available and active. Thus, modeling capabilities may be enabled after retrieval of remote metadata. Further, although developed in a system where all metadata may be available and active, at runtime in the distributed scenario, the remote part of the metadata may not be installed and thus metadata on top of this part may not be activated.

Figure 6:
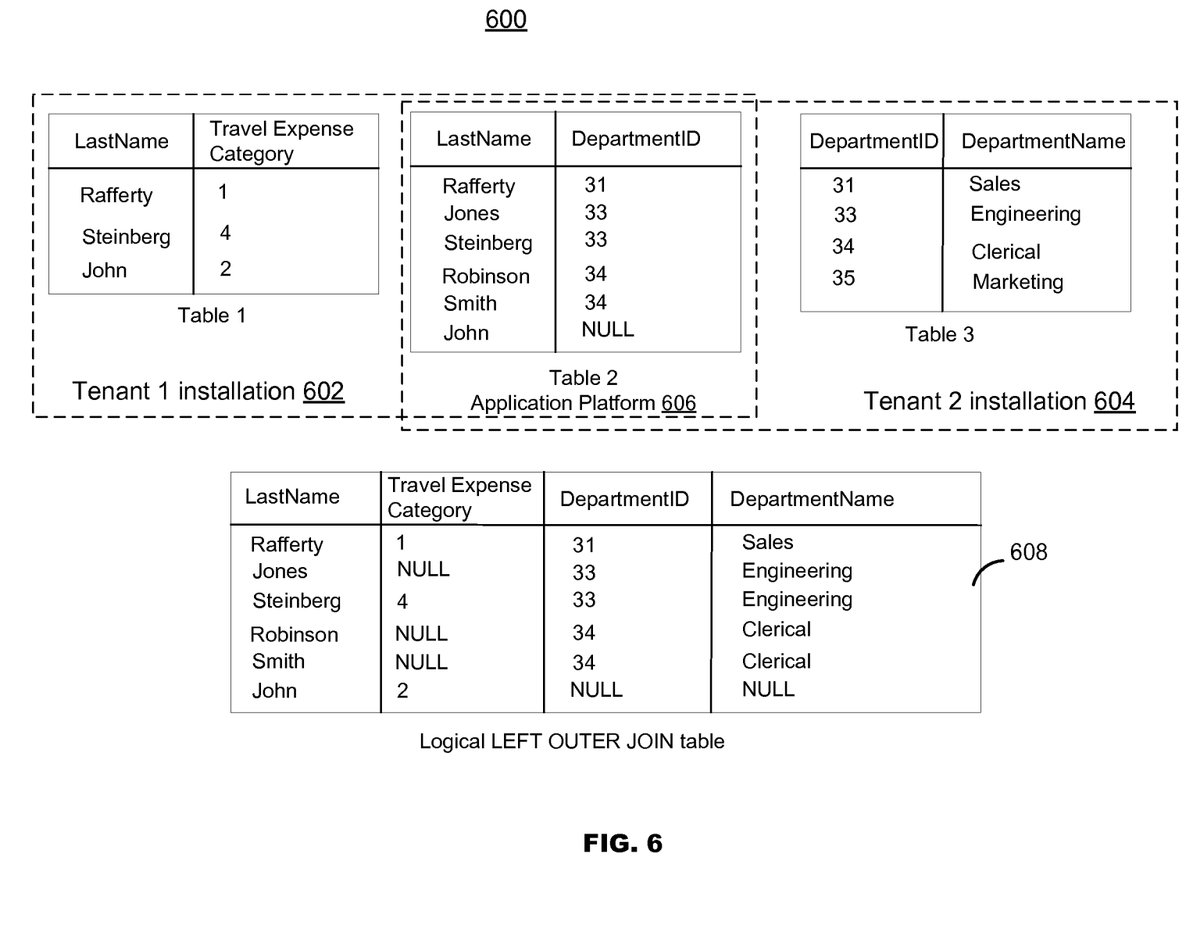
FIG. 6 illustrates an exemplary data distribution and joining according to an exemplary embodiment of the present invention.

Data for BOs may be stored in tables. FIG. 6 illustrates an exemplary data distribution and joining according to an exemplary embodiment of the present invention. As shown in FIG. 6, Table 1 may be a "Travel Expenses" table and a part of the tenant 1 installation 602, and Table 3 may be an "Employee" table and a part of the tenant 2 installation 604. Table 2 may be "Department" table and a part of the application platform 606 and thus, Table 2 may be included in both the tenant 1 installation 602 and the tenant 2 installation 606. A reporting instance may be split into different parts such that tenant 1 may contain part-views referencing BO data in tables 1 and 2, and Tenant 2 may contain part-views referencing BO data in table 3. The table 608 may show a logical left outer join joining data in all three tables.

Figure 7:
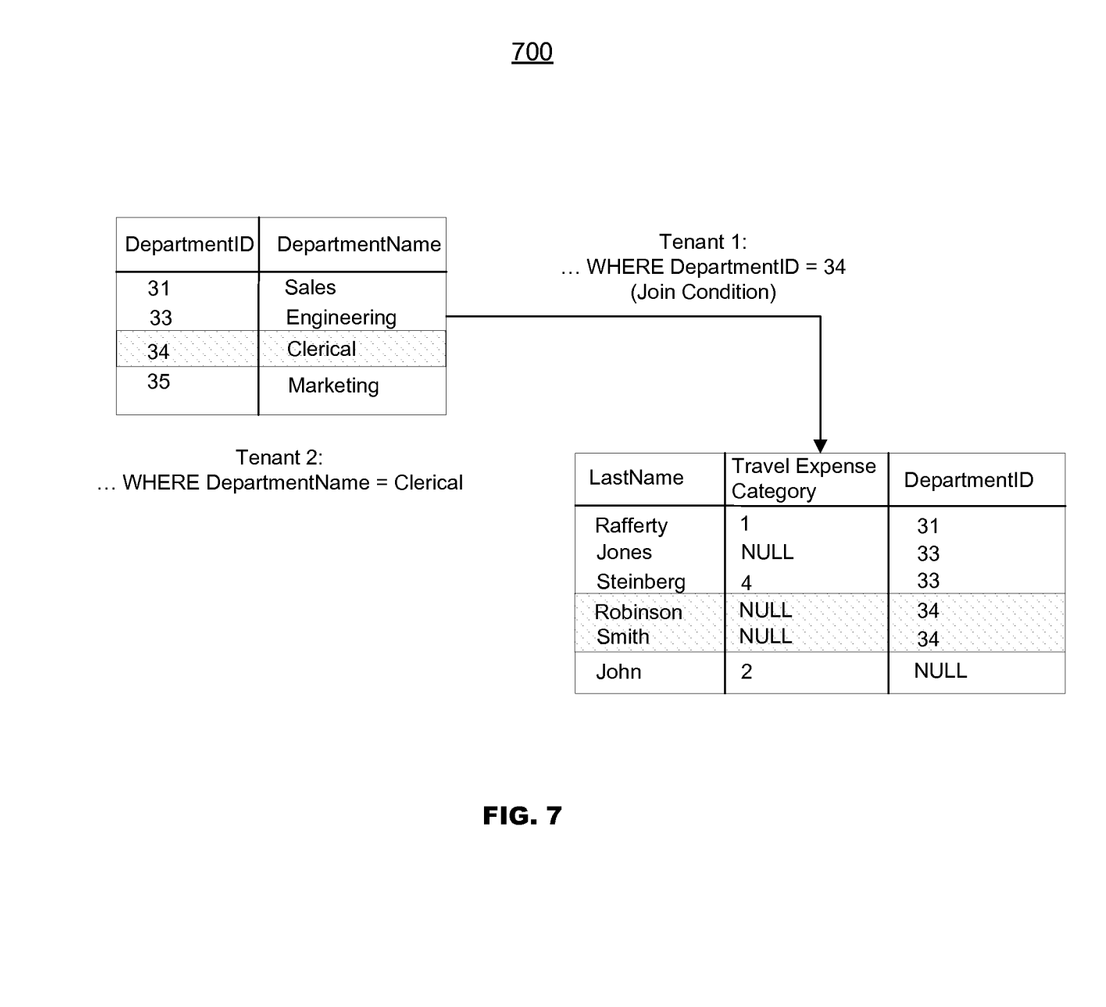
FIG. 7 illustrates an exemplary data retrieval according to an exemplary embodiment of the present invention.
Figure 8:
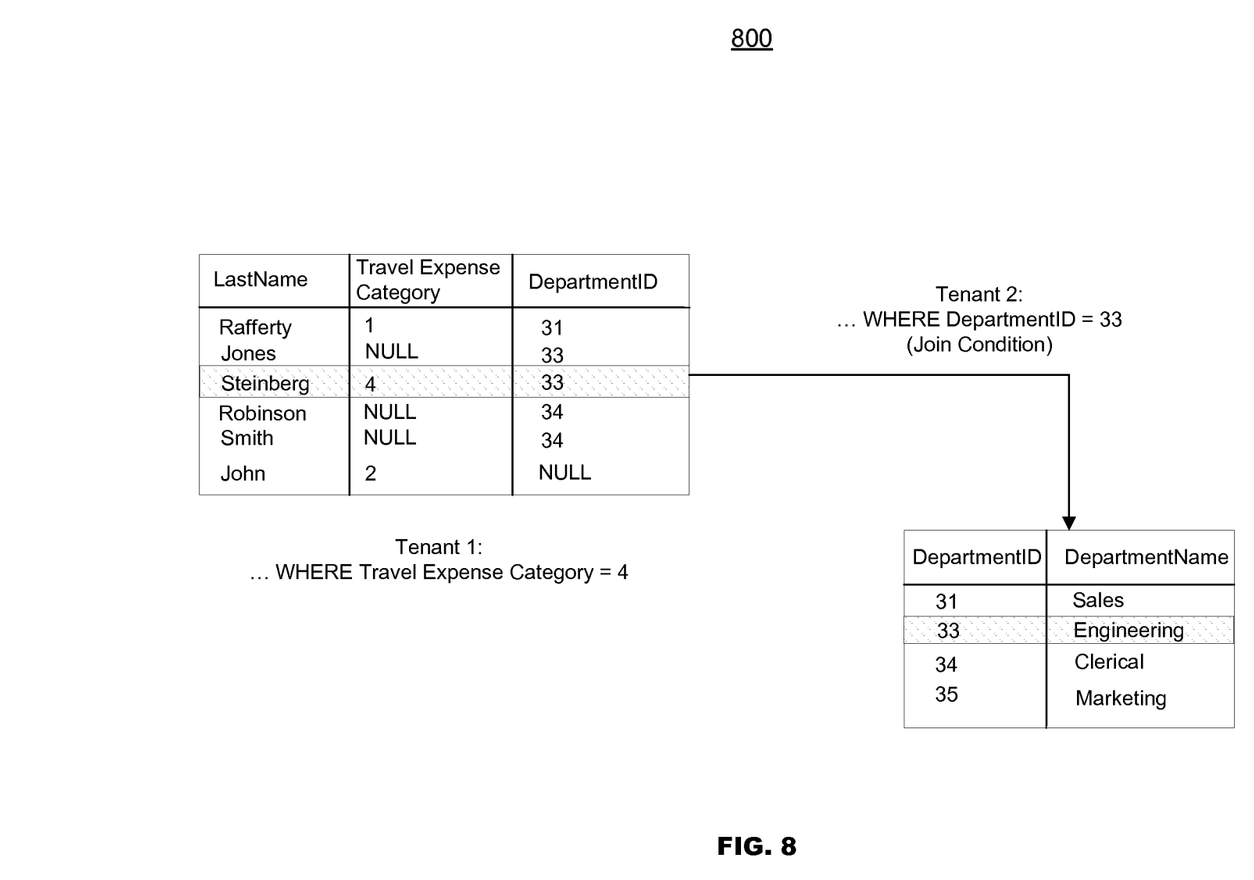
FIG. 8 illustrates another exemplary data retrieval according to an exemplary embodiment of the present invention.

FIGS. 7 and 8 illustrate two exemplary data retrieval schemes according to an exemplary embodiment of the present invention. One or more embodiments of the present invention may reduce the amount of data that has to be transferred to a local analytics runtime engine where the report execution may be launched. To avoid transactional data replications to a central system, only the data needed to report on will be retrieved at run time when a report is executed. In one embodiment, the retrieval of the amount of data which is requested by the OLAP engine in analytics is mainly controlled (reduced) by: selection parameters, filters, join conditions between parts in different NWAs (including temporal joins) and OLAP functionalities. The OLAP functionalities may further include: exceptional aggregation, formula aggregation, elimination of internal business volume, and other factors. In one embodiment, filters (UI parameters) and selection parameters may be treated logically alike because both of them may be part of the WHERE clause of the selection of data. And even the WHERE and the ON (Join) condition may be similar in defining the amount of data to be retrieved.

FIG. 7 illustrates an exemplary data retrieval when all filters/parameters and join conditions may be on the remote side. As shown in FIG. 7, the filter of "WHERE DepartmentName=Clerical" may be applied first remotely and the resulting number of hits may be transferred to the local tenant. In the local tenant, the JOIN with the condition of "WHERE DepartmentID=34" may be executed and the resulting table may be the final table of data to be transferred to an OLAP engine. For example, the remote filter may generate a single hit with "WHERE DepartmentID=34" and this single hit may be used as the join condition to have the two hits in generate a final table with two records.

FIG. 8 illustrates an exemplary data retrieval when all filters/parameters and join conditions may be on the local side. As shown in FIG. 8, the filter of "WHERE Travel Expense Category=4" may be applied first locally. The resulting number of hits may lead to a number of conditions for the JOIN condition. These number of conditions may be transferred to the remote tenant. The resulting amount of remote data may be fetched. In the remote tenant the JOIN with the condition of "WHERE DepartmentID=33 may be executed and the resulting table may be transferred to the local tenant (Tenant 1) and joined with the first result created in the local tenant. The resulting table may be the final table of data to be transferred to the OLAP engine. For example, the local filter of "WHERE Travel Expense Category=4" may be applied locally and the hits generated may be transferred to the remote tenant as join conditions to be used remotely.

In another embodiment, filters may be distributed locally and remotely. The local part may be applied first locally and—again—the resulting number of hits may lead to a number of conditions for the JOIN condition which can be added to the remote part of the WHERE condition and can be transferred to the remote tenant. The resulting amount of data in the remote tenant may be fetched to the local tenant. In the local tenant, the JOIN may be executed and the resulting table may be the final table of data to be transferred to the OLAP engine. In case of a "long in-list" of JOIN conditions (e.g., list of records satisfying the condition have to be transferred to the remote tenant), the in-list (e.g., condition list) may be transferred and the data may be fetched in several chunks.

One or more embodiments of the present invention may include the following features. Cross-Networked Application analytics content (MDAVS) may be developed in a software layer on top of the single NWA. Out of the NWA-assignment of the metadata in the different software layers and out of the landscape directory for the different software layers, a system/tenant assignment may be derived, which may be used at runtime to retrieve data from the different systems/tenants. Further, cross-NWA Query Definitions may be built with sub-units (e.g., sub-views) corresponding to BOs in the different software layers (the application platform, NWA 1, NWA 2, etc.) which may be "executed" and or queried separately at runtime. For example, only relevant sub-views in separate tenants (sub-views 1 and 2 in tenant 1 etc.) may be "partly activated" at runtime. In addition, data retrieval with filters/parameters may be analyzed and WHERE conditions may be split into parts corresponding to the NWAs/tenants. For example, the filters may be applied in the sequence as described above. Moreover, the whole setup may build upon an architecture where (flat) data retrieval may be done before data are handed over to the OLAP engine.

Figure 9:
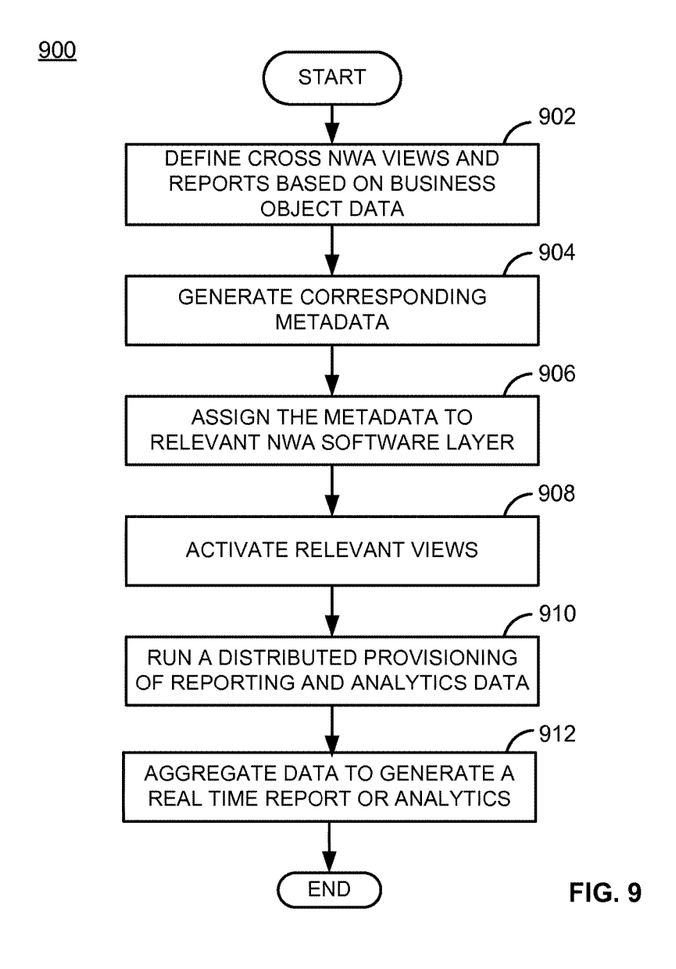
FIG. 9 illustrates a flow chart for generating report and analytics across NWAs according to an exemplary embodiment of the present invention.

FIG. 9 illustrates a process 900 for generating reports and analytics across NWAs according to an exemplary embodiment of the present invention. The process 900 may generate reports and analytics across NWAs based on business object data distributed across NWAs. At block 902, views and reports across NWAs may be defined based on business object data distributed among the NWAs. For example, MDAVs may be defined based on business object data from multiple NWAs (e.g., from different database tenants). At block 904, corresponding metadata may be generated. For example, partviews, subqueries (e.g., query definitions) for data contained in each NWA may be generated. At block 906, the metadata may be assigned to relevant NWA software layer. As described above with respect to FIG. 5, a cross NWA software layer may include a shared transactional data MDAV and transactional data QDef. Partviews for corresponding to underlying NWA's business object data may be assigned to the transactional data QDef. At block 908, relevant views may activated. Because remote data may not be available all the time, in one embodiment, only relevant sub-views in separate tenants (sub-views 1 and 2 in tenant 1 etc.) may be "partly activated" at runtime. At block 910, a distributed provisioning of reporting and analytics data may be performed. The distributed provisioning of data may be based on the locality of the filter/conditions to minimize amount of data to be fetched. In one embodiment, a query may be split to different parallel sub-queries at run time, because same MDAV executer engine (provided by an application platform) may be running in both applications and tenants. At block 912, the data may be aggregated to generate a real time report or analytics. The OLAP engine may be handed the final table of data combined from across NWAs and generate report or analytics.

Figure 10:
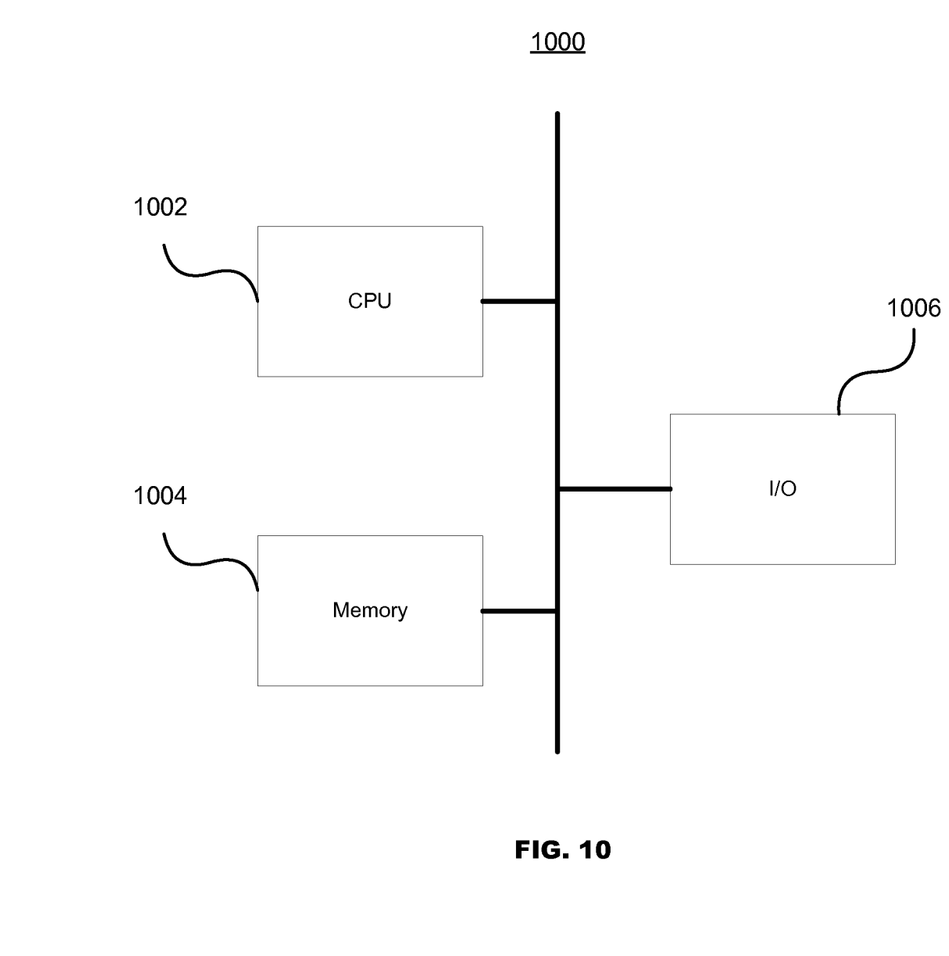
FIG. 10 illustrates a computer server according to an exemplary distribution scenario for metadata and data.

FIG. 10 illustrates a computer server 1000 according to an exemplary embodiment of the invention. The computer server 1000 may includes a processor 1002, memory 1004, and an I/O device(s) 1006. The processor 1002 is connected to the memory 1004 and I/O device(s) 1006. These connections are direct or via other internal electronic circuitry or components.

The processor 1002 is a programmable processor that executes instructions residing in the memory 1004 to receive and send data via the I/O device(s) 1006. The instructions may perform the operations of the application context and rule based UI control described herein. The term programmable processor as used herein is any programmable microprocessor or processor or combination of microprocessors or processors that can operate on digital data, which may be special or general purpose processors coupled to receive data and instructions from, and to transmit data and instructions to, a machine-readable medium. According to one embodiment of the present invention the processor 1002 may be an Intel® microprocessor.

Memory 1004 is a machine-readable medium that stores data that is processed by processor 1002. The term machine-readable medium as used herein is any addressable storage device that stores digital data including any computer program product, apparatus and/or device (e.g., a random access memory (RAM), read only memory (ROM), magnetic disc, optical disc, programmable logic device (PLD), tape, hard drives, RAID storage device, flash memory or any combination of these devices). This may include external machine-readable mediums that are connected to processor 1002 via one or more I/O device(s) 1006.

The I/O device(s) 1006 may include one or more input/output devices (e.g., a touch screen, a network adapter) and interfaces that receive and/or send digital data to and from an external device. Interfaces as used herein are any point of access to an external device where digital data is received or sent, including ports, buffers, queues, subsets thereof, or any other interface to an external device.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A non-transitory computer-readable storage medium embodied with program instructions for causing a computer to execute a method for generating a report or analytics based on real time data across a first and second networked application (NWA), the method comprising:
    defining a first transactional data multi-dimensional analytical view (MDAV), belonging to a metadata repository, associated with the first NWA and a local database tenant, wherein the local database tenant stores data associated with the first NWA and the first transactional data MDAV is based on data distributed across the local database tenant;
    defining a second transactional data MDAV, belonging to the metadata repository, associated with the second NWA and a remote database tenant, wherein the remote database tenant stores data associated with the second NWA and the second transactional data MDAV is based on the data distributed across the remote database tenant;
    defining a first master data MDAV, belonging to the metadata repository, associated with the first NWA and the local database tenant, wherein the first master data MDAV is joined to each of the transactional data MDAVs and the first master data MDAV contains display only attributes;
    defining a second master data MDAV, belonging to the metadata repository, associated with the second NWA and the remote database tenant, wherein the second master data MDAV is joined to each of the transactional data MDAVs and the second master data MDAV contains display only attributes; and
    in response to receipt of a user query subsequent to the defining of the first and second transactional MDAVs and the first and second master data MDAVs:
        defining a third transactional data MDAV, belonging to the metadata repository, associated with both NWAs and both of the database tenants, wherein:
            the first transactional data MDAV is combined with the third transactional data MDAV in a first union operation to allow the first and third transactions data MDAVs to share data;
            the second transactional data MDAV is combined with the third transactional data MDAV in a second union operation to allow the second and third transactional data MDAVs to share data; and
        generating the report of analytics using a first MDAV runtime engine associated with the first NWA, wherein:
            a remote filter is applied to the remote database tenant using a second MDAV runtime engine associated with the second NWA to generate a remote set of results; and
            data in the remote set of results is used to apply a local filter to the local database tenant using the first MDAV runtime engine associated with the first NWA to generate the report or analytics.

2. The non-transitory computer-readable storage medium of claim 1, wherein each NWA is built on top of a common application platform layer, wherein the metadata repository and the first and second MDAV runtime engines form part of the common application platform layer.

3. The non-transitory computer-readable storage medium of claim 2, wherein the common application platform layer includes a foundation business object that defines a foreign key relationship between data of two business objects, the first business object being associated with the first NWA and the second business object being associated with the second NWA.

4. The non-transitory computer-readable storage medium of claim 3, wherein the first and second business objects are stored in different database tenants corresponding to the first and second NWAs respectively.

5. The non-transitory computer-readable storage medium of claim 1, wherein the MDAVs are defined in a cross-NWA consolidation software layer on top of the NWAs to be combined at development time.

6. The non-transitory computer-readable storage medium of claim 1, wherein, in response to the user query, a remote filter is applied remotely first and only data satisfying the remote filter is fetched.

7. The non-transitory computer-readable storage medium of claim 1, wherein, in response to the user query, a local filter is applied locally first and only data satisfying the local filter is fetched.

8. An apparatus for local process integration, comprising:
    a memory to store computer program instructions; and
    a processor configured to execute the computer program instructions to execute a method for generating a report or analytics based on real time data across a first and second networked application (NWA), the method comprising:
        defining a first transactional data multi-dimensional analytic view (MDAV), belonging to a metadata repository, associated with the first NWA and a local database tenant, wherein the local database tenant stores data associated with the first NWA and the first transactional data MDAV is based on the data distributed across the local database tenant;
        defining a second transactional data MDAV, belonging to the metadata repository, associated with the second NWA and a remote database tenant, wherein the remote database tenant stores data associated with the second NWA and the second transactional data MDAV is based on the data distributed across the remote database tenant;
        defining a first master data MDAV, belonging to the metadata repository, associated with the first NWA and the local database tenant, wherein the first master data MDAV is joined to each of the transactional data MDAVs and the first master data MDAV contains display attributes;
        defining a second master data MDAV, belonging to the metadata repository, associated with the second NWA and the remote database tenant, wherein the second master data MDAV is joined to each of the transactional data MDAVs and the second master data MDAV contains display attributes; and in response to the receipt of a user query subsequent to the defining of the first and second transactional MDAVs and the first and second master data MDAVs:
  defining a third transactional data MDAV, belonging to the metadata repository, associated with both NWAs and both of the database tenants, wherein:
    the first transactional data MDAV is combined with the third transactional MDAV in a first union operation to allow the first and third transactional data MDAVs to share data,
    the second transactional data MDAV is combined with the third transactional data MDAV in a second union operation to allow the second and third transactional data MDAV to share data;
  generating a report or analytics using a first MDAV runtime engine associated with the first NWA, wherein:
    a remote filter is applied to the remote database tenant using a second MDAV runtime engine associated with the second NWA to generate a remote set of results, and
    data in the remote set of results used to apply a local filter to the local database tenant using the first MDAV runtime engine associated with the first NWA to generate the report analytics.

9. The apparatus of claim 8, wherein each NWA is built on top of a common application platform layer, wherein the metadata repository and the first and second MDAV runtime engines form part of the common application platform layer.

10. The apparatus of claim 9, wherein the common application platform layer includes a foundation business object that defines a foreign key relationship between data of two business objects, the first business object being associated with the first NWA and the second business object being associated with the second NWA.

11. The apparatus of claim 10, wherein the first and second business objects are stored in different database tenants corresponding to the first and second NWAs respectively.

12. The apparatus of claim 8, wherein the MDAVs are defined in a cross-NWA consolidation software layer on top of the NWAs to be combined.

13. The apparatus of claim 8, wherein, in response to the user query, a remote filter is applied remotely first and only data satisfying the remote filter is fetched.

14. A computer implemented method being implemented by one or more data processors forming part of at least one computing device for local process integration, the method comprising:
  defining, by at least one data processor in a graphical user interface, a first transactional data multi-dimensional analytical view (MDAV), belonging to a metadata repository, associated with the first NWA and a local database tenant, wherein the local database tenant stores data associated with the first NWA and the first transactional data MDAV is based on the data distributed across the local database tenant;
  defining, by at least one data processor in the graphical user interface, a second transactional data MDAV, belonging to the metadata repository, associated with the second NWA and a remote database tenant, wherein the remote database tenant stores data associated with the second NWA and the second transactions data MDAV is based on the data distributed across the remote database tenant;
  defining, by at least one data processor in the graphical user interface, a first master data MDAV, belonging to the metadata repository, associated with the first NWA and the local database tenant, wherein the first master data MDAV is joined to each of the transactional data MDAVs and the first master data MDAV contains display only attributes;
  defining, by at least one data processor in the graphical user interface, a second master data MDAV, belonging to the metadata repository, associated with the second NWA and the remote database tenant, wherein the second master data MDAV is joined to each of the transactional data MDAVs and the second master data MDAV contains display only attributes; and
  in response to a receipt of a user query subsequent to the defining of the first and second transactional MDAVs and the first and second master data MDAVs:
    defining, by at least one data processor in the graphical user interface, a third transactional data MDAV, belonging to the metadata repository, associated with the first NWA and the local database tenant, wherein:
      the first transactional data MDAV is combined with the third transactional data MDAV in a first union operation to allow the first and the third transactional data MDAVs to share data,
      the second transactional data MDAV is combined with the third transactional data MDAV in a second union operation to allow the second and third transactional MDAVs to share data; and
    generating, by at least one data processor in the graphical user interface, the report or analytics using a first MDAV runtime engine associated with the first NWA, wherein:
      a remote filter is applied to the remote database tenant using a second MDAV runtime engine associated with the second NWA to generate a remote set of results, and
      data in the remote set of results is used to apply a local filter to the local database tenant using the first MDAV runtime engine associated with the first NWA to generate the report or analytic.

15. The computer implemented method of claim 14, wherein each NWA is built on top of a common application platform layer, wherein the metadata repository and the first and second MDAV runtime engines form part of the common application platform layer.

16. The computer implemented method of claim 15, wherein the common application platform layer includes a foundation business object that defines a foreign key relationship between data of two business objects, the first business object being associated with the first NWA and the second business object being associated with the second NWA.

17. The computer implemented method of claim 16, wherein the first and second business objects are stored in different database tenants corresponding to the first and second NWAs respectively.

18. The computer implemented method of claim 14, wherein the MDAVs are defined in a cross-NWA consolidation software layer on top of the NWAs to be combined.

19. The computer implemented method of claim 14, wherein a remote filter is applied remotely first using the second MDAV runtime engine associated with the second NWA and only data satisfying the remote filter is fetched and combined with related data in the first tenant database by the first MDAV runtime engine.

20. The computer implemented method of claim 14, wherein a local filter is applied locally first using the first MDAV runtime engine associated with the first NWA and only data satisfying the local filter is fetched and combined with related data in the second tenant database by the first MDAV runtime engine.

\* \* \* \* \*